United States Patent
Burgdorf et al.

(10) Patent No.: US 9,227,561 B2
(45) Date of Patent: Jan. 5, 2016

(54) SENSOR ARRANGEMENT AND METHOD FOR TRANSMITTING AN ITEM OF BRAKING OPERATION INFORMATION

(75) Inventors: Christian Burgdorf, Offenbach (DE); Ralf Hartmann, Kriftel (DE); Sören Lehmann, Frankfurt (DE); Josko Kurbasa, Waldsolms (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 128 days.

(21) Appl. No.: 14/115,689

(22) PCT Filed: May 8, 2012

(86) PCT No.: PCT/EP2012/058466
§ 371 (c)(1),
(2), (4) Date: Feb. 10, 2014

(87) PCT Pub. No.: WO2012/152797
PCT Pub. Date: Nov. 15, 2012

(65) Prior Publication Data
US 2014/0139333 A1    May 22, 2014

(30) Foreign Application Priority Data

May 9, 2011   (DE) .......................... 10 2011 075 534
Dec. 15, 2011  (DE) .......................... 10 2011 088 753

(51) Int. Cl.
*B60Q 1/44*  (2006.01)
*B60T 7/04*  (2006.01)
*B60T 17/22*  (2006.01)

(52) U.S. Cl.
CPC *B60Q 1/44* (2013.01); *B60Q 1/441* (2013.01); *B60T 7/04* (2013.01); *B60T 7/042* (2013.01); *B60T 17/22* (2013.01); *B60T 2220/04* (2013.01)

(58) Field of Classification Search
CPC ............ B60Q 1/444; B60Q 1/54; B60Q 1/44; B60Q 1/441; B60W 50/14; B60W 2420/42; B60W 2520/10; B60W 2540/10; B60W 2540/12; B60W 30/181; B60W 2050/146; B60H 1/00492; B60K 25/00; B60K 37/02
USPC ................. 340/479, 691.6, 815.45, 428, 427, 340/426.32, 438, 439, 453
See application file for complete search history.

(56) References Cited

U.S. PATENT DOCUMENTS 4,629,043 A * 12/1986 Matsuo et al. ................. 477/184
4,629,258 A * 12/1986 Resch et al. ............. 303/122.13

(Continued)

FOREIGN PATENT DOCUMENTS

| DE | 20 2004 009 835 U1 | 11/2004 |
| DE | 10 2007 030 254 A1 | 1/2008 |
| DE | 10 2008 003 801 A1 | 7/2009 |

OTHER PUBLICATIONS

International Search Report for PCT/EP2012/058466 mailed Oct. 19, 2012.

(Continued)

*Primary Examiner* — Daniel Previl
(74) *Attorney, Agent, or Firm* — RatnerPrestia

(57) ABSTRACT

The invention specifies a sensor arrangement for a brake system for braking a wheel in a vehicle, which brake system includes a travel sensor for detecting a position of a brake pedal of the brake system, wherein the travel sensor is provided for detecting operation of the brake pedal based on the position of the brake pedal and for outputting a signal which indicates operation of the brake pedal.

11 Claims, 4 Drawing Sheets

(56) References Cited

U.S. PATENT DOCUMENTS 6,135,577 A * 10/2000 Ishii .......................... 303/114.1
6,135,578 A * 10/2000 Clar et al. ................. 303/114.3
2007/0279207 A1* 12/2007 Clark et al. ................. 340/479
2009/0105919 A1* 4/2009 Karnjate et al. ............... 701/70
2010/0242637 A1* 9/2010 Inamori et al. ............... 74/15.86

OTHER PUBLICATIONS

German Search Report for 10 2011 088 753.9 mailed Jun. 13, 2012.

* cited by examiner

SENSOR ARRANGEMENT AND METHOD FOR TRANSMITTING AN ITEM OF BRAKING OPERATION INFORMATION

CROSS REFERENCE TO RELATED APPLICATIONS

This application is the U.S. National Phase Application of PCT/EP2012/058466, filed May 8, 2012, which claims priority to German Patent Application Nos. 2011 075 534.9, filed May 9, 2011 and 10 2011 088 753.9, filed Dec. 15, 2011, the contents of such applications being incorporated by reference herein.

FIELD OF THE INVENTION

The invention relates to a sensor arrangement for a brake system for braking a wheel in a vehicle, to the vehicle and to a method for controlling a display means for displaying operation of a brake pedal in a vehicle.

BACKGROUND OF THE INVENTION

For safety reasons, vehicles must be provided with a brake light which indicates the operation of the brake to a vehicle traveling behind by means of a light signal.

SUMMARY OF THE INVENTION

An aspect of the invention improves the detection of the operation of the brake.

An aspect of the invention proposes deriving the operation of the brake from the position of a brake pedal controlling the brake.

An aspect of the invention is based on the consideration that operation of the brake system by the driver could usually be detected using contactless switches. These switches could be fitted, for example, to the pedal or to the tandem master cylinder, in which case, after brake operation by the driver has been detected via a circuit containing the switch, a corresponding item of brake operation information or a corresponding brake operation signal can be generated and provided.

Another aspect of the invention is based on the consideration that the switch is redundant in brake systems which already have a travel sensor for detecting the position of the brake pedal since an unambiguous item of information with regard to whether or not the brake pedal is moved and the brake of the brake system is therefore operated can also be derived from the position of the brake pedal.

Therefore, an aspect of the invention specifies a sensor arrangement for a brake system for braking a wheel in a vehicle, said arrangement comprising a travel sensor for detecting a position of a brake pedal of the brake system, the travel sensor being provided for the purpose of detecting operation of the brake pedal on the basis of the position of the brake pedal and outputting a signal which indicates the operation of the brake pedal.

The use of the travel sensor for the purpose of detecting brake operation dispenses with a redundant switch, which results in noticeable cost savings. In addition, the installation space needed to accommodate the redundant switch including its circuit is dispensed with, as a result of which considerable space savings are also noticeable. Finally, the wiring complexity is also reduced, for example on the part of the vehicle manufacturer, since the switch which has been dispensed with and its circuit no longer need to be incorporated in the communication network of the vehicle.

The travel sensor is preferably provided for the purpose of detecting the operation of the brake pedal if the position of the brake pedal exceeds a predetermined threshold value. In this manner, not only the operation of the brake pedal but also the end of operation of the brake pedal and thus the brake of the brake system can be detected using a single criterion.

Alternatively or additionally, the travel sensor may be provided for the purpose of detecting the operation of the brake pedal if a gradient of the position of the brake pedal has a value different from zero. In this manner, the operation of the brake pedal can be directly detected from the zero position of the brake pedal, with the result that there is no need to first wait until a particular threshold value.

In this case, the travel sensor may be provided, in a particularly favorable manner, for the purpose of activating or deactivating the signal on the basis of gradients. For example, the signal could be permanently activated by the detection of a positive gradient different from zero, while the signal is permanently deactivated by the detection of a negative gradient different from zero since the direction of movement of the pedal is clear from the gradient and it is thus possible to determine whether the driver is currently pressing the brake pedal or releasing the latter.

In another development of the invention, the position of the brake pedal is superimposed in the signal on the information with regard to whether the brake pedal is operated. In this manner, a plurality of items of information can be transmitted to the circuit units superordinate to the sensor arrangement in the communication network of the vehicle using a single data cable. The reduced wiring complexity thus makes it possible to save costs, space and production expenditure caused by wiring.

In one particular development of the invention, the travel sensor is provided for the purpose of outputting a further signal which indicates the position of the brake pedal. Separately outputting the signal indicating the position and the signal indicating brake operation makes it possible for the two signals to be transmitted independently of one another according to different criteria such as failure safety, information throughput, etc.

In one preferred development of the invention, the travel sensor is provided for the purpose of superimposing a supply voltage of the travel sensor on the signal. This makes it possible to use another line which is already present in the brake system of the vehicle to transmit the signal in order to reduce wiring complexity.

The invention also specifies a brake system for braking at least one wheel of a vehicle, said system comprising a brake pedal for generating a brake signal on the basis of a position of the brake pedal, a stated sensor arrangement and an electronic control unit for detecting the signal and for outputting a control signal for a display means if the signal indicates the operation of the brake pedal.

The invention also specifies a vehicle comprising at least one wheel and a stated brake system for braking the wheel.

The invention also specifies a method for controlling a display means for displaying operation of a brake pedal in a vehicle, said method comprising the steps of detection of a position of the brake pedal, detection of operation of the brake pedal on the basis of the position of the brake pedal, and control of the display means if the operation of the brake pedal has been detected.

BRIEF DESCRIPTION OF THE DRAWINGS

The above-described properties, features and advantages of this invention and the manner in which they are achieved become more clearly and distinctly comprehensible in connection with the following description of the exemplary embodiments which are explained in more detail in connection with the drawings, in which.

DETAILED DESCRIPTION OF THE INVENTION

Figure 1:
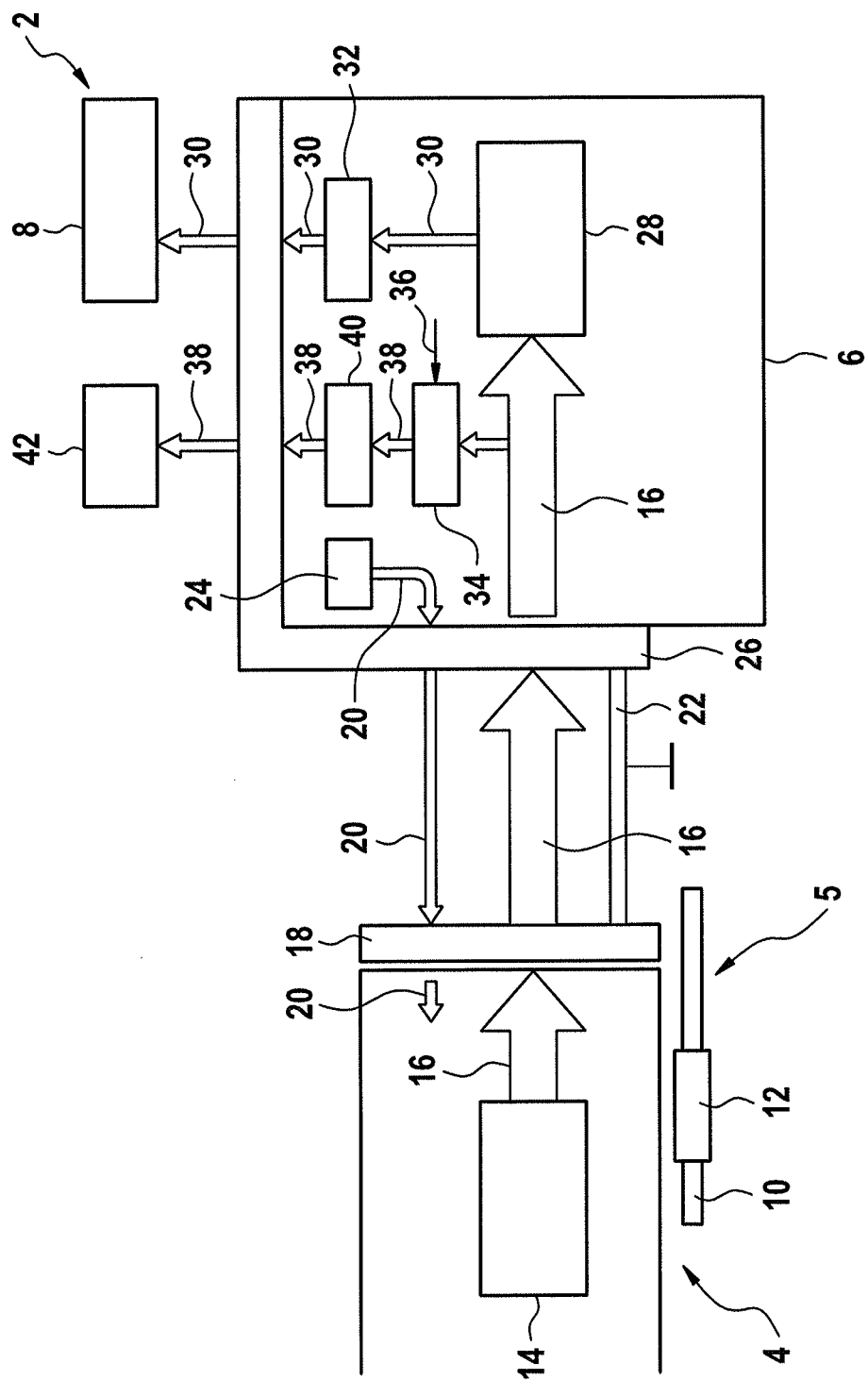
FIG. 1 shows part of a communication network in a vehicle having a travel sensor according to a first exemplary embodiment of the invention.

Reference is made to FIG. 1 which shows part of a communication network 2 in a vehicle having a travel sensor 4 according to a first exemplary embodiment of the invention.

The travel sensor 4 comprises a sensor device 5 and an electronic control unit 6 (called ECU 6 below) which belongs to a brake system (not illustrated in any more detail). The ECU communicates with a central motor vehicle control unit 8.

The sensor device 5 comprises a sensor element 10 which is connected to a brake pedal 12 of the vehicle and outputs the position of the brake pedal 12 to a microcontroller 14 in the sensor device 5 in the form of a measurement variable (not described in any more detail). In this case, the position of the brake pedal 12 may be a distance and/or angle size. The microcontroller 14 converts the position of the brake pedal 12 into an electronic measurement signal 16 and outputs it to the ECU 6 via an interface 18. The sensor device 5 is also supplied with a supply voltage 20 with respect to a ground potential 22 from the ECU 6 via the interface 18.

The ECU 6 has a voltage source 24 from which it outputs the supply voltage 20 via an interface 26 present in the ECU 6. The ECU 6 also has its own microcontroller 28 which receives the measurement signal 16 containing the position of the brake pedal and electronically conditions said signal. Conditioning may comprise, for example, noise filtering and/or coding of the measurement signal 16.

The conditioned measurement signal 30 is then sent, via a transceiver 32 and the interface 26, to the motor vehicle control unit which can use the conditioned measurement signal 30 for control purposes within the scope of the anti-lock braking system, for example. In addition to the microcontroller 28, the ECU 6 has a signal decoder 34 which likewise receives the electronic measurement signal 16. The signal decoder 34 analyses the measurement signal 16 with respect to operation of the brake pedal 12. For this purpose, the signal decoder 34 can compare the measurement signal 16 with a threshold value 36, for example, and can output the operation of the brake pedal 12 as an operation signal 38 if the measurement signal 16 exceeds the threshold value 36. The threshold value 36 may be externally supplied to the signal decoder 34, as shown, or may be internally stored in the signal decoder 34. Alternatively or additionally, the signal decoder 34 may determine, for example, a change in the measurement signal 16 on the basis of the gradient of the measurement signal 16, for example, and may thus infer operation of the brake pedal 12. In order to determine whether the driver closes or opens the brake, the signal decoder 34 may consider the mathematical sign of the gradient, for example. If the measurement signal 16 changes and the driver closes the brake, the signal decoder 34 switches on the operation signal 38. If the measurement signal 16 changes and the driver opens the brake, the signal decoder 34 switches off the operation signal 38. The operation signal 38 is output directly to a brake light system 42 via a hardware output 40 and the interface 26 in the ECU 6 in order to activate said system.

Figure 2:
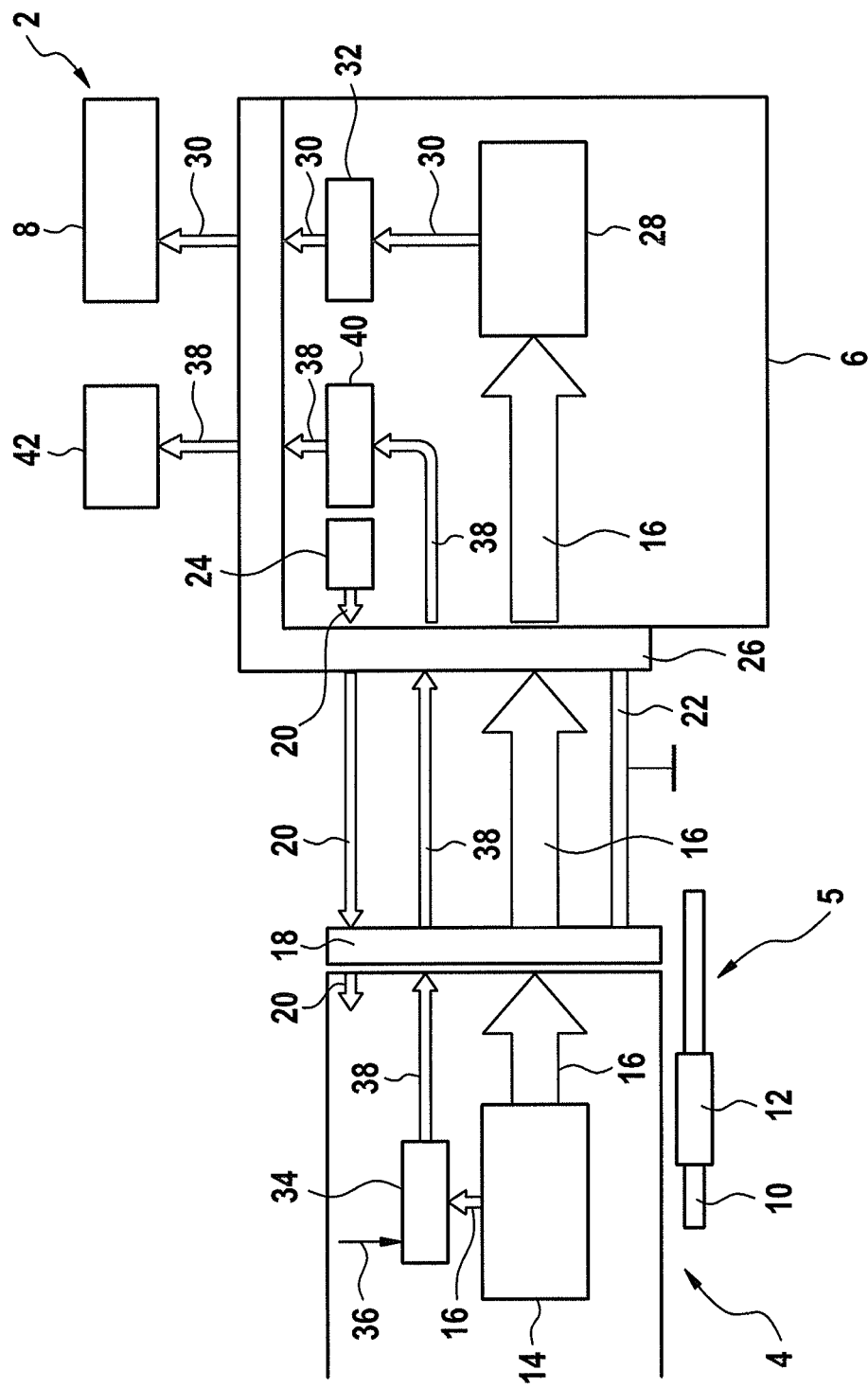
FIG. 2 shows part of a communication network in a vehicle having a travel sensor according to a second exemplary embodiment of the invention.

Reference is made to FIG. 2 which shows part of a communication network 2 in a vehicle having a travel sensor 4 according to a second exemplary embodiment of the invention.

In FIG. 2, the same elements as in FIG. 1 are provided with the same reference symbols and are not described again.

In the exemplary embodiment in FIG. 2, the signal decoder 34 is situated in the sensor device 5. In this case, the operation signal 38 is transmitted, via its own line, to the interface 26 of the ECU 6 via the interface 18 of the sensor device 5 and is finally transmitted to the hardware output 40.

Figure 3:
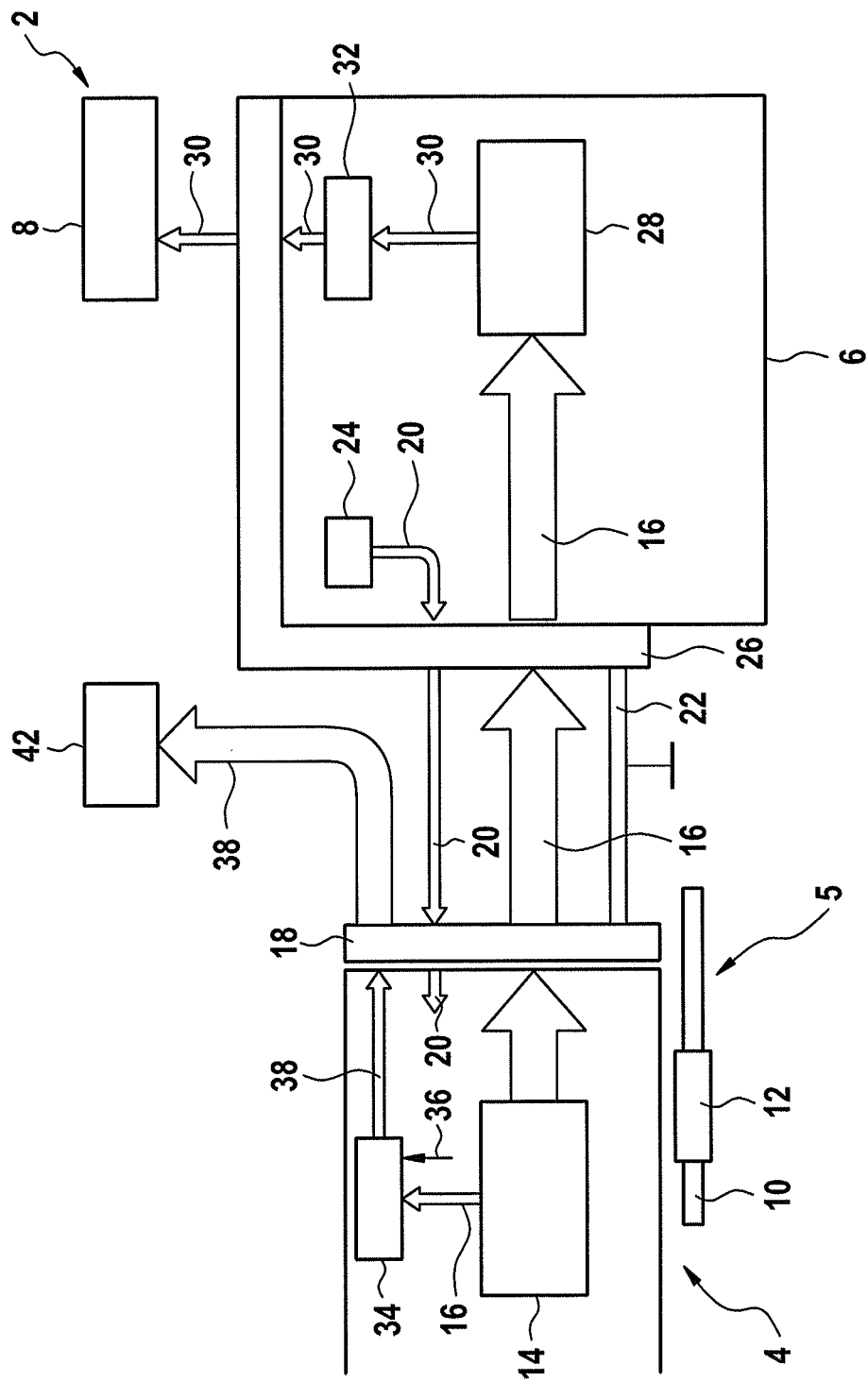
FIG. 3 shows part of a communication network in a vehicle having a travel sensor according to a third exemplary embodiment of the invention.

Reference is made to FIG. 3 which shows part of a communication network 2 in a vehicle having a travel sensor 4 according to a third exemplary embodiment of the invention. In FIG. 3, the same elements as in FIGS. 1 and 2 are provided with the same reference symbols and are not described again.

In the exemplary embodiment in FIG. 3, the signal decoder 34 is situated in the sensor device 5 again. This time, the operation signal 38 is output directly to the brake light system 42 without passing through the ECU 6. Therefore, faults in the ECU 6 do not influence the function of the brake light system 42.

Figure 4:
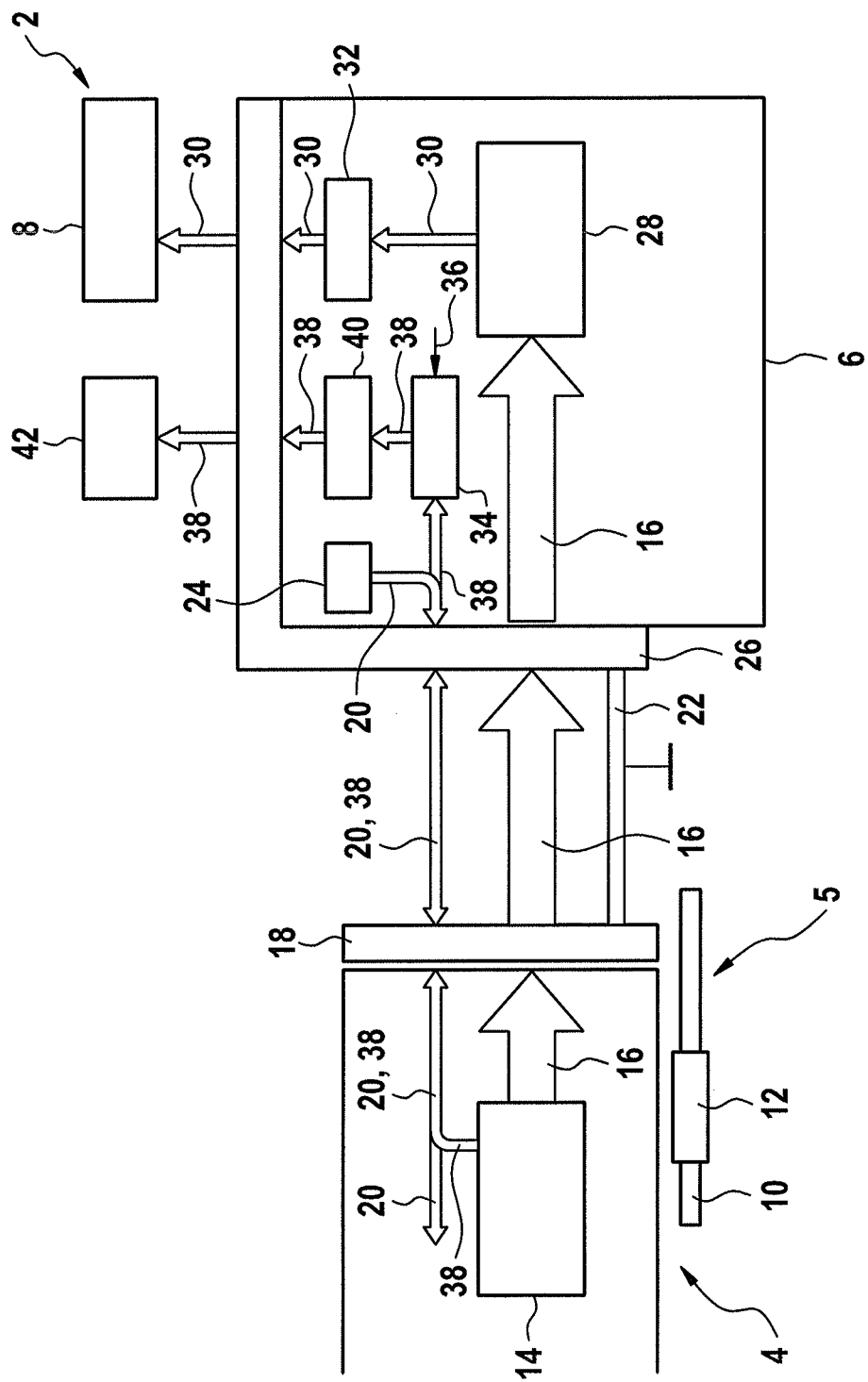
FIG. 4 shows part of a communication network in a vehicle having a travel sensor according to a fourth exemplary embodiment of the invention.

Reference is made to FIG. 4 which shows part of a communication network 2 in a vehicle having a travel sensor 4 according to a fourth exemplary embodiment of the invention. In FIG. 4, the same elements as in FIGS. 1 and 2 are provided with the same reference symbols and are not described again.

In the exemplary embodiment in FIG. 4, the signal decoder 34 is situated in the sensor device 5 again. This time, the operation signal 38 is modulated onto the supply voltage 20 and is thus transmitted between the sensor device 5 and the ECU 6 via the line of the supply voltage 20. The modulation may be effected, for example, by simply superposing the supply voltage 20 and the operation signal 38.

The invention claimed is:

1. A sensor arrangement for a brake system for braking a wheel in a vehicle, comprising:
   a travel sensor including:
      a sensor controller for detecting a position of a brake pedal of the brake system and outputting a measurement signal, and
      a decoder receiving the measurement signal, decoding the measurement signal, and in response to decoding the measurement signal, outputting an operation signal which turns ON a brake light of the vehicle.

2. The sensor arrangement as claimed in claim 1, the travel sensor being provided for the purpose of detecting operation of the brake pedal if the position of the brake pedal exceeds a predetermined threshold value.

3. The sensor arrangement as claimed in claim 1, the travel sensor being provided for the purpose of detecting operation of the brake pedal if a gradient of the position of the brake pedal has a value different from zero.

4. The sensor arrangement as claimed in claim 3, the travel sensor being provided for the purpose of activating or deactivating the signal on the basis of gradients.

5. The sensor arrangement as claimed in claim 1, the position of the brake pedal being superimposed in the signal on the information with regard to whether the brake pedal is operated.

6. The sensor arrangement as claimed in claim 1, the travel sensor being provided for the purpose of outputting a further signal which indicates the position of the brake pedal.

7. The sensor arrangement as claimed in claim 1, the travel sensor being provided for the purpose of superimposing a supply voltage of the travel sensor on the signal.

8. A brake system for braking at least one wheel of a vehicle, comprising a brake pedal for generating a brake signal on the basis of a position of the brake pedal, a sensor arrangement as claimed in claim 1 and an electronic control unit for detecting the signal and for outputting a control signal for a display means if the signal indicates the operation of the brake pedal.

9. A vehicle comprising at least one wheel and a brake system as claimed in claim 8 for braking the wheel.

10. A method for controlling a display means for displaying operation of a brake pedal in a vehicle, comprising:

detecting, by a sensor controller, a position of the brake pedal, and outputting a measurement signal;

receiving, by a decoder, the measurement signal;

decoding, by the decoder, the measurement signal; and in response to decoding the measurement signal, outputting, by the decoder, an operation signal which turns ON a brake light of the vehicle.

11. A brake system for braking a wheel in a vehicle, comprising:

a travel sensor including a sensor controller for detecting a position of a brake pedal of the brake system, superimposing a measurement signal onto a power supply voltage, and outputting the superimposed signal, and a brake controller including a decoder receiving the measurement signal and the superimposed signal, decoding the superimposed signal, and in response to decoding the superimposed signal, outputting an operation signal which turns ON a brake light of the vehicle.

* * * * *